United States Patent [19]
Vaeth et al.

[11] 4,061,727
[45] Dec. 6, 1977

[54] MANUFACTURE OF γ-IRON(III) OXIDE

[75] Inventors: Guenter Vaeth, Limburgerhof; Manfred Ohlinger, Frankenthal; Heinz Stritzinger; Eduard Schoenafinger, both of Ludwigshafen; Eugen Wettstein, Germersheim; Wolfgang Guth, Ludwigshafen, all of Germany

[73] Assignee: BASF Aktiengesellschaft, Ludwigshafen, Germany

[21] Appl. No.: 732,909

[22] Filed: Oct. 15, 1976

[30] Foreign Application Priority Data

Nov. 8, 1975 Germany ............................ 2550225

[51] Int. Cl.$^2$ ............................................. C01G 49/02
[52] U.S. Cl. ...................................... 423/634; 423/633
[58] Field of Search ............... 423/633, 634, 140, 142, 423/151, 152

[56] References Cited

U.S. PATENT DOCUMENTS

| 3,845,198 | 10/1974 | Marcot | 423/634 |
| 3,912,646 | 10/1975 | Leitner et al. | 423/634 |
| 3,947,502 | 3/1976 | Leitner et al. | 423/634 |

Primary Examiner—Earl C. Thomas
Assistant Examiner—Wayne A. Langel
Attorney, Agent, or Firm—Keil, Thompson & Shurtleff

[57] ABSTRACT

Acicular γ-iron(III) oxide is manufactured by reacting an iron(II) salt solution with aqueous solutions of alkali metal hydroxides and oxidizing the resulting suspension of iron(II) hyroxides in 3 stages. In the first stage not more than 8 percent by weight of the iron(II) hydroxide originally present is oxidized over a period of 0.5 to 4 hours, in the second stage from 25 to 55 percent by weight over a period of 1.5 to 6 hours and the remainder thereof in a third stage. Following this oxidation, the goethite formed is reduced to magnetite, which is then oxidized to acicular γ-iron(III) oxide.

8 Claims, No Drawings

MANUFACTURE OF γ-IRON(III) OXIDE

The present invention relates to a process for the manufacture of γ-iron(III) oxide and to its use as magnetizable pigment in magnetic recording media.

In the manufacture of magnetic recording media wide use is made of acicular γ-iron(III) oxide produced, for example, from α-iron(III) oxide hydrate (α—FeOOH, goethite) by dehydration to α—$Fe_2O_3$, reduction of said α—$Fe_2O_3$ to magnetite ($Fe_3O_4$) followed by oxidation with oxygen-containing gases at temperatues of from 100° to 400° C.

The magnetic and electroacoustic properties of γ-iron(III) oxide depend to a large extent on the size and shape of the particles.

This is not only true of γ-iron(III) oxide used as magnetic pigment but also of the α—FeOOH used as starting material, the geometrical shape and crystal size of which have a decisive influence on the properties of the γ-iron(III) oxide produced therefrom.

α—FeOOH suitable for conversion to magnetic γ-iron(III) oxide may be prepared either by the acid or the alkaline process.

The acid process is carried out in two stages. In the first stage, nuclei of α-FeOOH are prepared by oxidation of iron(II) sulfate in acid suspension, and in the second stage further α—FeOOH is formed in the suspension in the presence of metallic iron by oxidation, which α—FeOOH grows onto the nuclei formed in the first stage. This process has the drawback of a low space-time yield and of giving α—FeOOH which does not have a very pronounced acicular nature. However, it has the advantage that the reaction can be discontinued when a specific particle size has been reached.

In the alkaline process, which is also carried out on an industrial scale, iron(II) hydroxide is precipitated from an iron(II) salt solution by reaction with an excess amount of caustic alkali solution, the precipitate then being converted to α—FeOOH by passing oxygen-containing gases into the mixture. This process is superior to the acid process in that the space-time yield is from 5 to 10 times higher, the α—FeOOH formed has pronounced acicular characteristics showing a length-to-width ratio of from 15 to 20:1, and the coercivity of the γ-iron(III) oxide prepared therefrom is very high. The disadvantage of this process is that it permits only imperfect control of the particle size, since the reaction can only be discontinued after all of the iron(II) oxide initially precipitated has been oxidized, as otherwise the magnetic and electroacoustic properties of the γ-iron-(III) oxide prepared therefrom would be impaired.

In order to minimize the drawbacks of the alkaline process and, in particular, to reduce the reaction time, it is known to stir the iron hydroxide suspension in an inert atmosphere prior to oxidation thereof. It is also known, in order to produce fine α—FeOOH crystals, to disperse the iron(II) salt solution in the alkali metal hydroxide solution in the absence of an oxidizing agent in such a manner that there is virtually no local excess of iron(II) salt. Furthermore, the resulting final dispersion should have a concentration of α-FeOOH of less than 15 g/l and a concentration of dissolved alkali metal hydroxide of less than 60 g/l. Followed oxidation, the resulting α—FeOOH dispersion should be heated to the boil to complete crystallization. Although these known measures have a certain influence on the pigmentary properties of α—FeOOH and the γ-iron(III) oxide prepared therefrom, they do not provide a uniform and consistent product quality.

It is an object of the present invention to provide a process for the manufacture of γ-iron(III) oxide by reacting an aqueous solution of an iron(II) salt with an aqueous solution of alkali metal hydroxide, oxidation of the resulting suspension of iron(II) hydroxide with oxygen or oxygen-containing gases to form α—FeOOH, reduction of the α—FeOOH, if desired after previous dehydration to γ-iron(III) oxide, to form magnetite, and oxidation of this magnetite to acicular γ-iron(III) oxide, which process provides a uniform product with regard to shape and size, the product being suitable for the manufacture of high-output and low-noise magnetic recording media.

We have found that this object is achieved by carrying out the oxidation of the iron(II) hydroxide suspension in 3 stages, not more than 8 percent by weight of the amount of iron(II) present being oxidized over a period of 0.5 to 4 hours in the first stage, from 25 to 55 percent by weight of the iron(II) originally present over a period of from 1.5 to 6 hours in the second stage and the remaining iron(II) in the third stage.

It is important to effect oxidation of the iron(II) hydroxide slowly at first and then faster as the reaction proceeds, for example by increasing the feed of oxidizing gas.

Thus not more than 8 percent by weight of the total amount of iron present in the suspension should be oxidized in the first stage, which lasts from 0.5 to 4 hours. Oxidation may be commenced during precipitation of the iron(II) hydroxide, but it is more advantageous, with a view to obtaining a particularly uniform quality of product, only to commence oxidation as soon as possible after completion of the precipitation, which is then carried out under an atmosphere of inert gas. This slow oxidation may be effected by causing a turbulent motion, for example stirring, of the suspension of iron-(II) hydroxide while its surface is in contact with an oxygen-containing gas, e.g. the atmosphere. It is not usually necessary to pass an oxygen-containing gas through the suspension.

In the second stage, the rate of oxidation is increased in such a way that from 25 to 55 percent of the iron(II) originally present in the suspension is oxidized to trivalent iron over a period of from 1.5 to 6 hours. This acceleration of the oxidation rate is achieved by passing an oxygen-containing gas, e.g. air or oxygen, or oxygen diluted with an inert gas such as nitrogen, through the suspension with continued stirring. It is advantageous to accelerate oxidation within this stage by gradually increasing the feed of oxygen-containing gas, this being effected by introducing from 0.1 to 0.4 mole of oxygen per hour per gram atom of the iron contained in the suspension at the beginning of the stage and then increasing the amount of oxygen introduced, either continuously or in steps, until it reaches from 0.2 to 0.9 mole at the end of the second stage. Oxidation in the second stage is preferably effected over from 2 to 4 hours. We prefer to introduce from 0.2 to 0.3 mole of oxygen per gram atom of iron contained in the suspension at the beginning of the second stage and to increase the amount of oxygen introduced until it reaches from 0.6 to 0.8 mole of oxygen per gram atom of iron at the end of the second stage. This slow and gradual acceleration of the rate of oxidation up to the end of the second stage causes uniform formation of α—FeOOH nuclei and this provides, at the end of the total oxidation phase an α—FeOOH which is uniform as regards crystal size and shape and which shows highly reproducible geometric dimensions.

Oxidation is completed in the third stage. Here, the rate of oxidation is not so critical and it may be increased substantially, if desired, to increase the space-time yield. For this reason, from 1 to 2 moles of oxygen per hour and preferably from 1.5 to 1.8 moles of oxygen per hour, per gram atom of the iron contained in the suspension, may be introduced into the suspension.

The iron(II) hydroxide suspension to be oxidized in accordance with the present invention is usually obtained by precipitation of iron(II) salt solutions, e.g. iron sulfate, iron chloride or iron nitrate, with aqueous alkali metal hydroxide solution, e.g. solutions of NaOH or KOH, used in an excess of from 2 to 5 times the stoichiometric amount. The suspensions obtained in this manner usually contain from 2.5 to 10% by weight of iron(II) hydroxide. The oxidation is advantageously carried out at temperatures of from 20° to 40° C. The reaction is carried out, for example, in a stirred vessel in the lower part of which the oxygen-containing gases are introduced over the entire cross-section, in order to effect as uniform a distribution thereof as possible.

The α—FeOOH crystals obtained by the process of the invention are next dehydrated in the usual way to α-iron(III) oxide, if necessary, at temperatures of from 150° to 190° C, before they are reduced to magnetite at temperatures of from 350° to 500° C using reducing gases such as hydrogen. The magnetite obtained is oxidized in the presence of oxygen or an oxygen-containing gas such as air to acicular γ-iron(III) oxide at temperatures of from 150° to 250° C.

It will be appreciated that the process of the invention is equally capable of producing γ-iron(III) oxides which are doped with foreign elements such as cobalt or manganese. These foreign elements may be introduced at any desired stage of the process, for example by adding salts of the foreign elements to the iron salt solutions used in the manufacture of iron (II) hydroxide or by subsequently applying the foreign elements to the surface of the α—FeOOH.

The α-iron(III) oxide pigments produced by the process of the invention are distinguished by a great particle size uniformity. This results from the equally narrow particle spectrum of the α-FeOOH, which has a surface area of from 35 to 60 m$^2$/g, as measured according to BET. Such pigments may be used for the manufacture of magnetic recording media for both audio and video purposes, particular characteristics of such media being high output and extremely low noise.

For the purpose of producing magnetic layers, the γ-iron(III) oxide obtained from the α-iron(III) oxide produced by the process of the invention is dispersed in known manner in polymeric binders. Examples of such binders are compounds known to be suitable for this purpose, for example homopolymers and copolymers of vinyl derivatives, polyurethanes and polyesters. The binders are used in solutions in suitable organic solvents, which solutions may contain further additives, for example to increase the conductivity and the conductivity and the abrasion resistance of the magnetic layers. The magnetic pigment, binders and any additives are milled to give a uniform dispersion which is applied to rigid or flexible substrates such as films, sheets or cards, whereupon the magnetic particles contained therein are oriented by a magnetic field and the layer is solidified by drying.

In the following Examples the parts and percentages are by weight unless otherwise stated.

EXAMPLE 1

19.4 kg of 15% caustic soda solution are placed in a 30 l stirred vessel. 4.2 kg of 30.5% FeCl$_2$ solution are added with stirring. The resulting Fe(OH)$_2$ suspension is stirred for 3 hours at 30° C in contact with air, during which period the concentration of Fe$^{++}$ falls from initially 0.548 mole of Fe$^{++}$/l (10 ml of suspension consume 48.2 ml of 0.1N KMnO$_4$ solution) by 1.2% (to a KMnO$_4$ consumption of 47.5 ml). 214 l of air are then introduced over 1 hour (0.20 mole of oxygen/gram atom of Fe). During the next hour the amount of air introduced is increased to 360 l (0.34 mole of oxygen per gram atom of Fe). During the third hour the amount of air introduced is raised to 530 l (0.49 mole of oxygen/gram atom of Fe). The Fe$^{++}$ content of the suspension falls by 38% during this period. During the fourth and further hours, air is introduced at a rate of 1500 l per hour (1.4 mole of oxygen/gram atom of Fe). The temperature is maintained at 33° C. Oxidation is complete after a further 8.5 hours. The acicular α—FeOOH is filtered, washed and dried. The yield is 900 g of α—FeOOH having a surface area of 43 m$^2$/g as measured according to BET. The bulk density is 0.38 g/cm$^3$.

EXAMPLE 2

19.2 kg of 12% caustic soda are placed in a 40 l vessel. 8.2 kg of 19% FeSO$_4$ solution are added with stirring. The resulting Fe(OH)$_2$ suspension is stirred at 27° C in contact with air until the Fe$^{++}$ concentration has fallen from 0.43 mole/l to 0.405 mole/l after a period of four hours. 255 l of air are then introduced with constant stirring over a period of 1 hour (0.24 mole of oxygen/gram atom of Fe). The air rate is then raised to 510 l/h (0.48 mole oxygen/gram atom of Fe) and then to 765 l/h (0.71 mole of oxygen/gram atom of Fe). After about 50% of the Fe$^{++}$ has been oxidized (to give a consumption of 0.1N KMnO$_4$ solution of 22.0 ml), after a period of 3.5 hours, the air rate is raised to 1500 l/h (1.4 mole of oxygen/gram atom of Fe/h). The temperature is maintained at 30° C. Oxidation is complete after a further 7.5 hours. The acicular α—FeOOH is filtered off, washed and dried. The yield is 900 g of α—FeOOH having a surface area of 57 m$^2$/g as measured according to BET. The bulk density is 0.42 g/cm$^3$.

COMPARATIVE EXAMPLE A

As in Example 1, 19.4 kg of 15% caustic soda solution are placed in a 30 l stirred vessel. 4.2 kg of 30.5% FeCl$_2$ solution are added with stirring. After the precipitation of Fe(OH)$_2$ is complete, 1,500 l/h of air (1.4 moles of oxygen/gram mole of Fe/h) are introduced into the suspension, the temperature being maintained at 30° C. All of the iron(III) hydroxide is oxidized after 9 hours. The surface area of the acicular pigment is 51 m$^2$/g, as measured according to BET.

COMPARATIVE EXAMPLE B

As in Example 1, 19.4 kg of 15% caustic soda solution are placed in a 30 l stirred vessel. 4.2 kg of 30% FeCl$_2$ solution are added with stirring. After the precipitation of Fe(OH)$_2$ is complete, 280 l/h of air (0.25 mole of oxygen/gram atom of Fe/h) are introduced into the suspension, the temperature being maintained at 30° C. All of the iron(III) hydroxide is oxidized after 41 hours. The surface area (BET) of the acicular pigment is 28 m$^2$.

EXAMPLE 3

19.4 kg of 15% caustic soda solution are placed in a 30 l stirred vessel. 8.2 kg of 19% FeSO$_4$ solution containing 68 g of dissolved cobalt chloride (CoCl$_2$ . 6H$_2$O) and 11.2 g of manganese sulfate (MnSO$_4$.4H$_2$O) are added with stirring. The resulting suspension is treated as described in Example 1. The resulting acicular α—FeOOH doped with 3% of Co and 0.5% of Mn has a surface area of 46 m$^2$/g (BET) and a bulk density of 0.37 g/cm$^3$.

EXAMPLE 4

200 g of α—FeOOH from Example 1 are slurried in 10 l of H$_2$O with vigorous stirring. 11.1 g of CoCl$_2$ and 1 g of MnSO$_4$ dissolved in water are then added. The pH is then adjusted to 7 with sulfuric acid with stirring. The pH is then raised to 9 with ammonia. THe precipitate is then filtered off and dried at 200° C.

COMPARATIVE EXAMPLE C

α—FeOOH from Comparative Example A is enclosed in cobalt and manganese hydroxide in the manner described in Example 4, and thereupon filtered and dried at 160° C.

The table below lists some of the characteristics of the α—FeOOH produced in Examples 1 to 4 and A to C.

EXAMPLE 5

Conversion of the α—FeOOH obtained in the above Examples to magnetic iron(III) oxide γ-Fe$_2$O$_3$ The α—FeOOH pigments obtained in Examples 1 to 4 and Comparative Examples A, B and C are identically reduced in the usual manner in a fluidized-bed reactor at a temperature of 400° C in an atmosphere of hydrogen and are then re-oxidized to γ-iron(III) oxide at temperatures of from 200° C to 250° C in a stream of air. After compression to 0.85 g/cm$^3$ the pigments have the magnetic properties and specific surface area as given in the table below.

| Ex. | 1 | 2 | A | B | 3 | 4 | C |
|---|---|---|---|---|---|---|---|
| | | | Powder Data | | | | |
| Hc (Oe) | 325 | 320 | 285 | 265 | 438 | 475 | 415 |
| Specific remanence (nTm$^3$/g) | 41.8 | 42.3 | 44.0 | 43.2 | 43.0 | 44.6 | 43.5 |
| BET (m$^2$/g) | 17.4 | 18.5 | 16.0 | 12.0 | 17.5 | 16.8 | 15 |

The resulting γ-Fe$_2$O$_3$ pigments obtained from the α—FeOOH produced by the process of the invention are used, as are the pigments obtained according to the Comparative Examples A to C, to prepare magnetic recording media on a polyethylene terephthalate film as base, each in identical conventional manner. The magnetic layer was prepared by dispersing the pigments under identical conditions in a partially saponified vinyl chloride/vinyl acetate copolymer with the addition of a mixture of equal parts by volume of tetrahydrofuran and toluene, this dispersion then being applied to the base film and dried. The thickness of the magnetic layer is 10 μm in each case. The magnetic properties of the resulting magnetic tapes, each of which was prepared in the same manner, were measured and are listed in the table below (measured according to DIN 45 512, sheet 2, related to reference tape C 264 Z).

| Pigments from Examples | 1 | 2 | A | B | 3 | 4 | C |
|---|---|---|---|---|---|---|---|
| | | | Tape Data | | | | |
| Relative bias current (dB) | 0 | 0 | 0 | 0 | 1.5 | 1.5 | 1.5 |
| Hc (Oe) | 331 | 325 | 295 | 273 | 465 | 476 | 420 |
| Remanence (mT) in the preferred direction | 12.5 | 12.1 | 10.9 | 10.2 | 11.0 | 11.3 | 10.5 |
| Orientation ratio | 1.95 | 1.88 | 1.68 | 1.35 | 1.81 | 1.84 | 1.65 |
| Sensitivity (dB) | +1.1 | +1.0 | −0.5 | +0.2 | +1.3 | +1.4 | +0.5 |
| Frequency response (dB) | +2.5 | +2.1 | −1.0 | −2.1 | +2.0 | +2.5 | −1 |
| Distortion ratio (dB) | +1.5 | +0.5 | −5 | −6.5 | +0.5 | 0 | −5.6 |
| Relative reference level to bias noise ratio (dB) | +0.4 | 0 | +0.2 | −0.9 | −0.3 | 0 | 0.4 |
| Relative maximum output level to bias noise ratio (dB) | +1.5 | +1.0 | −0.3 | −0.7 | +1.0 | +1.4 | +0.1 |

| Ex. | 1 | 2 | A | B | 3 | 4 | C |
|---|---|---|---|---|---|---|---|
| bulk density g/cm$^3$ | 0.38 | 0.42 | 0.39 | 0.33 | 0.37 | as 1 | as A |
| BET m$^2$/g | 43 | 57 | 51 | 28 | 46 | " | " |
| av. length of needles (μ) | 0.6 | 0.4 | 0.5 | 0.9 | 0.6 | " | " |
| needle length range (μ) | 0.6/0.7 | 0.4/0.5 | 0.3/0.8 | 0.6/1.1 | 0.5/0.5 | " | " |
| length-to-width ratio | 20:1 | 20:1 | 10:1 to 20:1 | 10:1 to 15:1 | 20:1 | " | " |

The above table demonstrates that α—FeOOH produced in the process of the invention as described in Examples 1 to 4 is distinguished by a narrower spectrum of particle sizes, as may be seen from the data referring to the needle length and length-to-width ratio.

The improved coercivity (Hc) of the tapes of Examples 1 and 2 compared with those of Comparative Examples A and B results in very good recordability at short wavelengths, as manifested by the frequency response data. The improved orientation ratio results in higher remanence values in the preferred direction, which is reflected by the improved distortion ratio. The relative maximum output level to bias noise ratio of the tapes, i.e. the sum of the sensitivity and the relative reference level to bias noise ratio, is also improved. These good electroacoustic properties of the tapes show that the pigments produced in the manner of the invention are eminently suitable for the manufacture of high-output, low-noise magnetic recording media. The same applies to the cobalt-impregnated pigments of higher coercivity of Examples 3 and 4, compared with the pigments of Example C, each measured at a relative bias current increased by 1.5 dB.

EXAMPLE 6

In a steel ball mill, γ-iron(III) oxide obtained according to Example 1 in conjunction with Example 5 is dispersed under conventional conditions in a binder mixture of polyester urethane and modified PVC in a ratio of 8:2 and containing dispersing and lubricating additives, in the presence of steel balls. The ratio of magnetic pigment to binder is 4:1 by weight. The above binders are dissolved in a 6:3:1 mixture of tetrahydrofuran, 1,4-dioxane and methyl ethyl ketone (The usual solvents for the binder are tetrahydrofurane, 1,4-dioxane and methyl ethyl ketone.) The concentration of the binder solution is about 7 percent. On completion of dispersion after about 4 days, the resulting dispersion is coated onto a 20 μm thick polyester film by means of a coater to give a layer having a thickness of 6 μm, the γ-$Fe_2O_3$ particles being oriented in the longitudinal direction in the wet layer by means of magnets. Calendering reduces the layer thickness to about 4.5 μm, whilst giving an average peak-to-valley height Rz of 0.08 μm. This magnetic recording material is cut into ½ inch tapes.

COMPARATIVE EXAMPLE D

Video tapes are prepared as described in Example 6 but using γ-iron(III) oxide obtained in Example A in conjunction with Example 5.

COMPARATIVE EXAMPLE E

Video tapes are prepared as described in Example 6 but using —iron(III) oxide obtained in Example B in conjunction with Example 5. The magnetic values and video measurements given in the following table were obtained on ½ inch tapes on a ½ inch video recorder (black and white reel-to-reel recorder).

| Magnetic values | | | Video | Sound | | | |
|---|---|---|---|---|---|---|---|
| Hc (Oe) | remanence mT | orientation ratio | RF level (DB) | relative S/N ratio (dB) | 333 c/s (dB) | 5 kc/s (dB) | Ex. |
| 325 | 12.0 | 1.90 | +2.2 | +2.0 | +0.8 | +1.2 | 6 |
| 315 | 11.5 | 1.80 | +0.7 | +0.5 | +0.3 | 0 | D |
| 290 | 10.0 | 1.60 | −1.5 | −2.3 | 0 | −1.1 | E |

RF = radio frequency magnetization
S/N ratio = Signal-to-noise ratio, measure of tape noise (mainly dependent on pigment)

The above table shows that the pigments of Example 6 give distinctly improved video tapes as compared with D and E on account of the increased RF level and the improved S/N ratio.

EXAMPLE 7

γ-$Fe_2O_3$ as obtained in Example 4 in conjunction with Example 5 is used in the preparation of magnetic recording media as described in Example 6. The thickness of the calendered coating is about 4.5 μm, this having been applied to a 12 μm thick polyester film. Here again, ½ inch video tapes are cut from the film.

COMPARATIVE EXAMPLE F

Video tapes using pigments obtained in Example C in conjunction with Example 5 are prepared under the conditions described in Examples 6 and 7.

Magnetic, video and audio values of tapes of Examples 7 and F as measured on a ½ inch color video recorder.

| Magnetic values | | | Video | Sound | | | |
|---|---|---|---|---|---|---|---|
| Hc (Oe) | remanence mT | orientation ratio | RF level (dB) | relative S/N ratio (dB) | 333 c/s (dB) | 5 kc/s (dB) | Ex. |
| 470 | 11 | 1.60 | 0 | +0.5 | +0.8 | +0.2 | 7 |
| 420 | 9.5 | 1.30 | −1 | −2.1 | 0 | −1.7 | F |

Comparison of the data given in the above table shows that the orientation ratio of Example 7 is substantially improved over Comparative Example F. Similarly, the remanence in the preferred direction of tape 7 is 16% better than in Comparative Example F.

The improved remanence, the more homogeneous magnetic oxide particle size in the tape of Example 7 and the increased coercivity results in a higher RF level, a better signal-to-noise ratio and improved audio values, particularly at higher frequencies (5 kc/s data).

We claim:

1. In a process for the manufacture of acicular γ-iron(III) oxide by reacting an aqueous solution of iron(II) salt with aqueous solutions of alkali metal hydroxides, oxidizing the resulting suspensions of iron(II) hydroxide with oxygen or oxygen-containing gases to goethite, reducing the resulting goethite to magnetite and oxidizing the magnetite to acicular γ-iron(III) oxide, the improvement comprising: carrying out the oxidation of the iron(II) hydroxide suspension in three stages, wherein in the first stage not more than 8% by weight of the iron(II) present is oxidized over a period of from 0.5 to 4 hours in the first stage, in the second stage from 25 to 55% of the iron(II) originally present in the suspension is oxidized over an additional period of 1.5 to 6 hours by introducing 0.1 to 0.4 mole per hour of oxygen/gram atom of the iron contained in the suspension at the beginning of said second stage and gradually increasing the introduction of oxygen during said second stage up to 0.2 to 0.9 mole per hour of $O_2$/g atom of iron at the end thereof and in the third stage oxidizing the remaining iron(II) by introducing 1 to 2 moles of oxygen per hour per gram atom of iron contained in the suspension.

2. A process as set forth in claim 1, wherein oxidation is carried out in the first stage with vigorous agitation of the suspension, the surface of which is in contact with the atmosphere.

3. A process as set forth in claim 1 wherein the oxidation in the second stage is carried out over a period of from 2 to 4 hours.

4. A process as set forth in claim 1 wherein at the commencement of the second stage from 0.2 to 0.3 mole per hour of oxygen per gram atom of the iron contained in the suspension is introduced into the suspension, this oxygen rate being increased during this stage to reach from 0.6 to 0.8 mole at the end thereof.

5. A process as set forth in claim 1 wherein the oxygen-containing gas used is air.

6. A process as set forth in claim 1 wherein from 1.5 to 1.8 moles of oxygen per gram atom of the iron contained in the suspension per hour are introduced into the suspension during the third stage.

7. A process as set forth in claim 1, wherein the goethite is dehydrated to α-iron(III) oxide prior to the reduction to magnetite.

8. A process as set forth in claim 1, wherein the oxidation is carried out at temperatures of from 20° to 40° C.

* * * * *